June 4, 1946.
W. C. HAHN
2,401,421
CONTROL SYSTEM
Filed Oct. 30, 1944
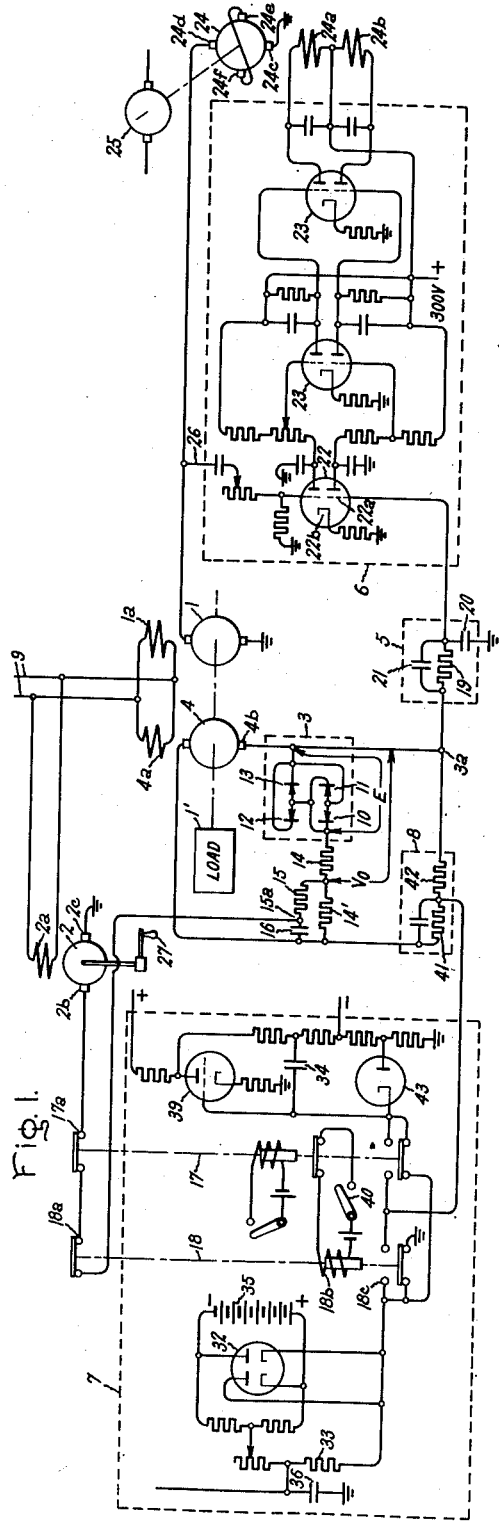
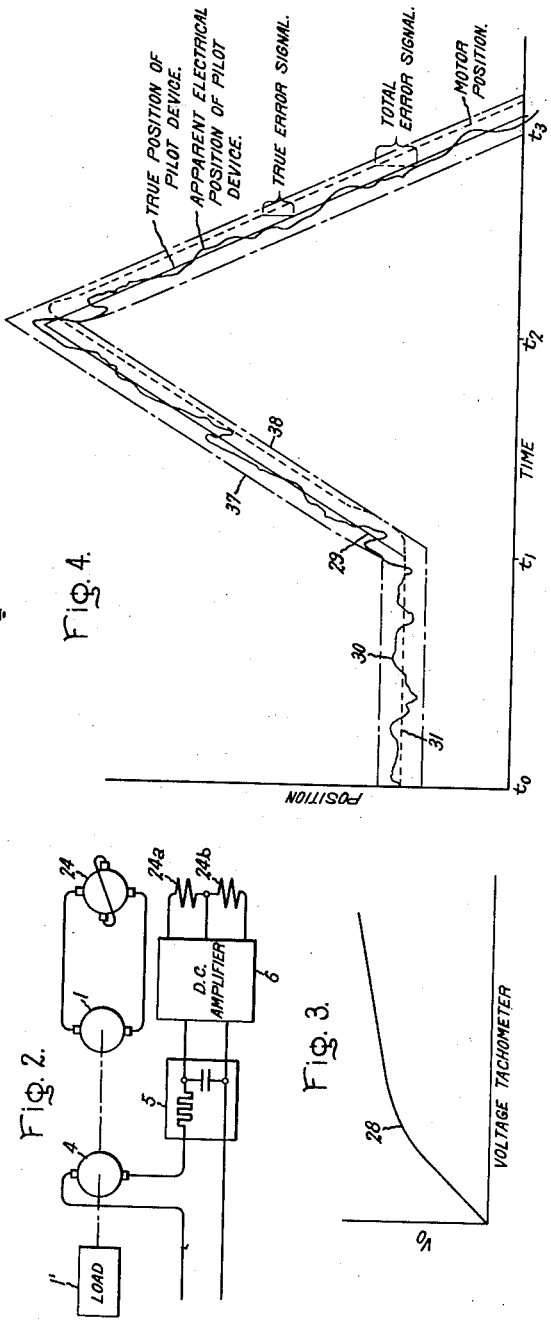
Inventor:
William C. Hahn,
by Harry E. Dunham
His Attorney.

Patented June 4, 1946

2,401,421

UNITED STATES PATENT OFFICE 2,401,421

CONTROL SYSTEM

William C. Hahn, Scotia, N. Y., assignor to General Electric Company, a corporation of New York Application October 30, 1944, Serial No. 561,116

9 Claims. (Cl. 172—239)

This invention relates to control systems, more particularly to servoamplifier or follow-up control systems, and it has for an object the provision of a simple, reliable, and improved control system of this character.

In some follow-up control system applications, a speed range of 10,000:1 may be required. For example, in the azimuth and elevation drives of radio detecting and ranging apparatus, the follow-up motor may be required to operate at a maximum speed of 4,000 R. P. M. and at a minimum speed of 0.4 R. P. M. Another requirement of follow-up systems of this character is that the following device shall follow the pilot device with a speed variation of not more than five per cent. In other words, the follow-up motor is required to operate smoothly at extremely low speeds. In follow-up systems in which the speed of the follow-up motor is being compared with a voltage signal, or in a position follow-up system in which there is considerable time delay between the occurrence of a positional error and the appearance of the error signal, the variations in the torque of a motor in one revolution which are produced by its slots and by variations in the friction of the driving connections operate to produce large variations in the speed of the motor. Accordingly, an object of this invention is the provision of a follow-up control system in which means are provided for counteracting the effect of such factors as tend to produce unevenness in the speed of the follow-up motor at extremely low speeds.

In the operation of automatic follow-up systems of the character described in the foregoing, in the nature of rapid variations, extraneous errors are introduced in the process of converting the mechanical position of the pilot device to an electrical signal. For example, in automatic tracking with radio detecting and ranging apparatus such errors may be introduced when the wave front of the signal returning from the target does not indicate the true position of the target owing to lobes, image reflections, and extraneous image reflections from objects near the target. Such extraneous errors in the signal voltage are also introduced by other factors such as variations in the voltage of the power supply and variations in filament voltage of the various amplifiers involved in converting the position of the pilot device to an electrical signal. Accordingly, a further object of the invention is the provision of means for eliminating the effect of such extraneous errors so that the movement and position of the driven object will not be affected by such extraneous errors and will follow the true position of the pilot device.

In carrying the invention into effect in one form thereof, the driven object or load is driven by suitable driving means which are controlled in response to a signal voltage which is a function of the positional disagreement between the pilot device and the driven object. Suitable electronic smoothing apparatus is provided for eliminating the extraneous variations in the error voltage from the total signal voltage. The smoothed error voltage is compared with a speed voltage which is produced by a tachometer generator driven by the follow-up motor and which is therefore proportional to the speed of the follow-up motor. This difference voltage is applied to a circuit which includes an integrating device comprising an RC network. This integrating device integrates the differential voltage. The integrated voltage is amplified by a suitable electric valve type amplifier, and the amplified voltage is utilized to cause the follow-up motor to rotate in a direction to diminish the error so that the error is eliminated when the driven object and the pilot device are in correspondence.

For a better and more complete understanding of the invention, reference should now be had to the following specification and to the accompanying drawing of which Fig. 1 is a simple, schematic diagram of an embodiment of the invention; Fig. 2 is a simplified diagrammatic sketch of a portion of the aparatus of Fig. 1; and Figs. 3 and 4 are charts of characteristic curves which facilitate an understanding of the operation of the invention.

Referring now to the drawing, an object 1', such, for example, as the antenna mount of a radio detecting and ranging apparatus, is driven in azimuth by suitable driving means illustrated as an electric motor 1. In manually controlled operation, the motor 1 follows the rotation of a manually driven pilot generator 2. The speed of the motor 1 is not linearly proportional to the speed of the pilot generator. For slow speeds of the pilot generator, the speed of the motor 1 is correspondingly slow, but as the speed of the pilot generator increases, the speed of the motor increases at a much greater rate. By means of a nonlinear resistance network 3 a control voltage is derived from a tachometer generator 4 which is driven by the motor 1 which varies nonlinearly with the speed of the motor 1. This derived control voltage is compared with the voltage of the pilot generator 2. The difference of these two voltages is supplied to an integrating network 5 and the integrated voltage is amplified by means of a suitable electric valve type amplifier 6. This amplified voltage is utilized to cause the motor 1 to run at a speed having a predetermined relationship to the speed of the pilot generator 1.

In automatic operation, a signal voltage which is proportional to the system error, i. e., the positional disagreement between the pilot device and driven object, is supplied to the input circuit of an electronic type smoothing device 7. This smoothing device removes unwanted extraneous variations in the nature of rapid fluctuations from the error signal voltage. The smoothed error voltage is supplied to a network 8 by means of which it is compared with a predetermined portion of the speed voltage generated by the tachometer generator, and the difference of these two voltages is supplied to the integrating network 5.

The voltage output of the integrating network is amplified by means of the amplifier 6 and the amplified voltage is utilized to cause the follow-up motor 1 to drive the driven object toward correspondence with the pilot device.

The follow-up motor 1, the manually rotatable pilot generator 2, and the tachometer generator 4 have field windings 1a, 2a, and 4a, respectively, which are excited from a suitable constant voltage D. C. source such as represented by the supply line 9.

The nonlinear network 3 comprises two parallel but reversely connected pairs of nonlinear resistance elements such as the copper oxide rectifiers 10, 11, 12 and 13. This nonlinear network is connected in series with two resistors 14 and 14' across the terminals of the tachometer generator 4. A resistance 15 and a capacitor 16 are connected in parallel with resistor 14', and the common connection points 15a of the capacitor and resistor are connected through the normally closed contacts 17a and 18a of two switching devices 17 and 18, respectively, to the armature terminal 2b of the pilot generator 2 of which the other terminal 2c is grounded. As a result of the foregoing connection, a voltage $V_0$ appears across the resistor 14 and the nonlinear network 3, when the tachometer generator 4 is rotated by the follow-up motor 1. Owing to the nonlinear characteristic of the network 3, this voltage $V_0$ varies nonlinearly with the voltage generated by the tachometer generator. The voltage generated by the pilot generator 2 is compared with the voltage $V_0$ and the difference is supplied to the integrating network 5 of which one terminal is connected to the common connection between the terminal 3a of the nonlinear network and the terminal 4b of the tachometer generator, and the other terminal is connected to ground and thus to the terminal 2c of the pilot generator.

The integrating network 5 comprises a resistor 19 and a capacitor 20 connected in series relationship. The resistor 19 is shunted by a capacitor 21. The integrating device preferably has a relatively long time constant, e. g., one second. If the capacitor 20 has a capacity of one microfarad and the resistor 19 has a resistance of one megohm, the integrating device will have a time constant of one second.

The difference voltage which is applied to the integrating device causes the charge on the capacitor 20 to change, thereby causing a charging current to flow through the resistor 19. This charging current is integrated and a voltage proportional to the integrated charging current appears across the capacitor 20. This voltage is supplied between the grid 22a and the cathode 22b of an electric valve 22 which constitutes the first stage of the electric valve amplifier 6.

As shown, the amplifier 6 is a high gain, three-stage, D. C. amplifier with push-pull output. The electric valves constituting the three stages are illustrated as twin triode valves. The amplified push-pull D. C. output voltages of the third-stage valves 23 are supplied to the two opposing control field windings 24a and 24b of a suitable armature excited dynamoelectric machine 24 of which the load brushes 24c and 24d are connected to the armature of the follow-up motor 1. The armature of the cross-armature excited dynamoelectric machine 24 is driven at a speed which is substantially constant by a suitable driving means such as the electric motor 25. The machine 24 is provided with a pair of short-circuited brushes 24e and 24f on an axis which is displaced 90 electrical degrees from the axis of the control field winding. The axis of the control field winding is referred to as the control axis.

As thus constructed, the machine 24 itself constitutes a two-stage amplifier. The net excitation produced by the two opposing control field windings along the control axis produces a voltage which causes a relatively large current to flow in the short circuit, and the current flowing in the short circuit produces a voltage at the load brushes 24c and 24d which is proportional to the net excitation along the control axis. Two very important characteristics of the machine 24 are its exceptionally high speed of response and its high amplification factor, i. e., the ratio between the watts input to the control field winding and the watts output supplied to the load circuit, i. e., the armature of the motor 1.

Antihunt operation is provided by means of a degenerative feedback connection 26 from the output terminal 24d of the dynamoelectric machine 24 to the grid 22a of the electric valve 22. The voltage applied to the anode-cathode circuit and the bias voltages supplied to the grids of the electric valves constituting the amplifier 6 are such that when the pilot generator 2 is at rest and zero voltage exists across the capacitor 20, both halves of the amplifier conduct equal amounts of current and both opposed control field windings 24a and 24b are equally excited. As a result, the net excitation of the machine 24 is zero and the follow-up motor is at rest.

During manual operation, the pilot generator 2 is rotated by means of the handcrank 27 with which it is provided so that a voltage proportional to speed is generated and supplied to the nonlinear network 3. The portion $V_0$ of the voltage generated by the tachometer generator 4 is compared with the voltage generated by the pilot generator. In starting from rest, the tachometer voltage is zero and consequently the difference voltage is relatively large. As explained in the foregoing, the difference of the pilot generator voltage and the voltage $V_0$ is supplied to the integrating network, and the resulting voltage across the capacitor 20 is amplified by means of the amplifier 6. This results in increasing the excitation of one of the field windings 24a and 24b and decreasing the excitation of the other. For example, it may be assumed that when the crank 27 of the generator 2 is rotated in a clockwise direction, the polarity of the voltage across the capacitor 20 is such as to increase the excitation of the field winding 24a and to decrease the excitation of the field winding 24b. The net excitation of the machine 24 is of such a polarity that the voltage supplied to the motor 1 causes it to rotate and drive the load in a direction corresponding to the direction of rotation of the handcrank 27. When the handcrank is rotated in the opposite direction, the net excitation of the machine 24 is of the opposite polarity and the motor 1 rotates in the opposite direction.

As the motor accelerates from rest, the tachometer generator 4 generates a voltage which increases with its speed. This tachometer generator voltage is supplied to the nonlinear network 3 so as to oppose the voltage $V_0$, thereby reducing the difference voltage applied to the integrating network. This reduces the net excitation of the machine 24. However, the net excitation is still sufficiently large to force the acceleration of the motor 1 but at a diminishing rate. This acceleration at a diminishing rate continues until a balanced condition is reached between the voltage of the tachometer generator 4 and the voltage $V_0$ which is derived from the pilot generator 2 such that any further increase in the voltage of the tachometer generator would reduce the differential voltage to such an extent that deceleration of the motor 1 would follow. If the speed of rotation of the pilot generator is low, the speed of the follow-up motor 1 therefore is correspondingly low. If the speed of the pilot generator is increased, the speed of the follow-up motor is increased more than the speed of the pilot generator is increased, owing to the nonlinear relationship between the voltage of the tachometer generator and the derived voltage $V_0$ with which the voltage of the pilot generator is compared. The nonlinear relationship is illustrated in Fig. 3 by the curve 28 of which ordinates represent the voltage $V_0$ and abscissae represent the voltage of the tachometer generator.

The integrating device produces a position follow-up control between the handcrank 27 and the position of the load. The voltage of the pilot generator 2 is proportional to its speed, i. e., it is equal to $C_1N$ in which $C_1$ is a constant and $N$ is the speed of the pilot generator. Similarly, the voltage of the tachometer generator is represented by $C_2S$ in which $C_2$ is a constant and $S$ is the speed of the follow-up motor 1. The integral of the voltage of the pilot generator is the position of the handcrank, i. e., the total number of degrees through which it is turned. Similarly, the integral of the tachometer generator voltage is the position of the load shaft which is driven by the motor 1. The voltage which appears across the capacitor 20 of the integrator network is the integral of the difference between the pilot generator voltage and the tachometer generator voltage which, in turn, is equal to the difference in the integrals of these two voltages and therefore equal to the difference in the positions of the handcrank 27 and the load.

The integration performed by the integrating circuit is adequate in most applications to produce a smooth operation of the follow-up motor at extremely slow speeds.

For the automatic follow-up operation, the load is to be driven in positional agreement with a pilot device (not shown). In Fig. 4, the position of the pilot device for an operation which is typical is represented by the curve 29 of which ordinates represent the position of the pilot device and abscissae represent time. This curve indicates that in the interval between the times $t_0$ and $t_1$, the position of the pilot device is stationary. In the interval between the times $t_1$ and $t_2$, the position of the pilot device is changing in one direction at a rate represented by the slope of the curve in this interval. Between the times $t_2$ and $t_3$, the position of the pilot device is changing in the opposite direction at a different rate.

By means of suitable apparatus, the position of the pilot device is converted into a signal voltage. The curve of the ideal signal voltage would be a replica of the curve 29 with ordinates representing voltage. However, owing to variations in the voltage supply, variations in image reflections, reflections from extraneous objects, and other factors, the actual signal voltage tends to have erratic variations superimposed on the ideal signal voltage. This is illustrated in Fig. 4 in which the curve 30 represents the signal voltage or the apparent electrical position of the pilot device. The erratic variations of this voltage are indicated by the departure of the curve 30 from the true position curve 29 of the pilot device. The position of the driven object is represented by the dotted line curve 31. When the system is at rest, the dotted line curve 31 coincides with the true position curve 29 of the pilot device, indicating positional correspondence of the driven object and pilot device. During operation, the load lags the pilot device, and the positional disagreement of the pilot device and driven object is known as the system error. This error is represented in Fig. 4 by the displacement along the axis of ordinates between the curves 29 and 31. A control voltage is produced which is proportional to the system error. This voltage is referred to as the error voltage. The system error must be large enough to produce an error signal voltage which will cause the follow-up motor to operate at the same speed as the pilot device. In Fig. 4, the displacement between the curves 30 and 31 represents the total error signal voltage, and the displacement between the curves 29 and 31 represents the true error signal voltage. Since it is desired to cause the system to be responsive only to the true error signal voltage, it is necessary to eliminate the effect of the variations which produce the difference between the true error signal voltage and the total error signal voltage. These variations tend to have an upper limit of magnitude.

The smoothing apparatus 7 which is provided for eliminating the effect of these extraneous variations comprises a twin diode electric valve 32, a resistor 33, and a capacitor 34. The two conducting paths of the diode are reversely connected and biased beyond cutoff by means of a battery 35. The total error signal voltage is impressed across the capacitor 36. If the magnitude of this impressed voltage does not exceed the bias voltage of the battery, the diode does not become conducting. In Fig. 4, the range of voltages within which the diode does not become conducting is represented by the displacement between the upper and lower limit curves 37 and 38. When the diode is not conducting, the resistor 33 and the capacitor 34 constitute a filter having a long time constant and effectively filters the extraneous variations from the total error signal voltage.

A triode electric valve 39 is provided having its grid connected to one terminal of the capacitor 34 and its anode connected to the other terminal. This connection effectively increases the capacity of capacitor 34. The voltage across the capacitor is an amplification of the incoming voltage and results in an apparent increase in capacity.

When the pilot device is changing positions and a system error exists, the total error signal voltage exceeds the bias voltage and the diode becomes conducting and effectively short-circuits the resistor 33 with the result that the filtering action ceases. When the system error is reduced by operation of the follow-up motor, the filtering action is resumed. Thus as long as the system error is maintained within limits such that the total error signal voltage does not exceed the bias voltage applied to the diode, the total error signal voltage is smoothed by the action of the filter. The result is that the unwanted relatively rapid variations in the total error signal voltage are filtered out and the relatively slow variations which are produced by change in the position of the pilot device remain effective. In other words, the system is not responsive to fast variations produced by factors other than changes in the position of the pilot device, but is responsive to slow variations such as those produced by changes in the position of the pilot device.

To initiate the automatic operation, the switch 40 is closed to complete an energizing circuit for the operating coil 18b of contactor 18. Responsive to energization, contactor 18 picks up and closes its normally open contacts 18c and opens its normally closed contacts 18a. In opening, the contacts 18a interrupt the connection between the manually driven pilot generator 2 and the nonlinear network 3. The contacts 18c in closing complete the connection between the smoothing apparatus 7 and an intermediate point of a voltage divider comprising the resistors 41 and 42 connected across the terminals of the tachometer generator 4. Thus a predetermined portion of the tachometer generator voltage is compared with the smoothed true error signal voltage and the difference of these two voltages is supplied to the integrating device 5. The integrated voltage is supplied to the amplifier 6 and the amplified voltage utilized to cause the follow-up motor 1 to drive the load in a direction to reduce the system error as explained in the foregoing specification in connection with the manual operation.

It is necessary to restrict the smoothed error signal voltage to a value such that at maximum speed of the follow-up motor, the voltage of the tachometer generator will be substantially equal to the error signal voltage. This restriction is applied by the diode valve 43 for an increase in negative voltage at the cathode of the diode 43. If the voltage at the cathode of the diode 43 becomes negative by more than a predetermined amount, the diode becomes conducting thereby restricting any further change in the negative direction. For increasing positive voltages at the cathode of the diode 43, the restriction is provided by the triode valve 39 as the result of current flow in its grid circuit.

Although in accordance with the provisions of the patent statutes, this invention is described as embodied in concrete form and the principle thereof has been explained together with the best manner in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A servoamplifier control system comprising in combination, means for producing a signal voltage, a driven object, driving means for said object, a tachometer generator driven by said driving means for producing a voltage proportional to the speed of said driving means, an integrating network for integrating the difference of said voltages over a predetermined period of time, and electric valve means for amplifying said integrated voltage to control said driving means to drive said object toward a position having a predetermined relationship to said signal voltage.

2. A servoamplifier control system comprising means for producing a signal voltage having a predetermined relationship to the system error between a pilot device and a driven object, driving means for said object, a tachometer generator driven by said driving means for producing a voltage proportional to the speed of said driving means, a resistance capacitance network for integrating the difference of said voltages, and electric valve means for amplifying said integrated difference voltage to control said driving means to drive said object in a direction to reduce said system error.

3. A servoamplifier control system comprising means for producing a signal voltage having a predetermined relationship to the system error between a pilot device and a driven object, driving means for said object, a tachometer generator driven by said driving means for producing a voltage proportional to the speed of said driving means, a resistance capacitance network for integrating the difference of said voltages, a D. C. push-pull electric valve amplifier for amplifying said integrated voltage, and an armature reaction excited dynamoelectric machine provided with opposed control field windings connected to be excited by said amplified voltage for controlling said driving means to drive said object in a direction to reduce said system error.

4. A servoamplifier control system comprising in combination, a manually operated pilot generator for producing a signal voltage, a driven object, an electric motor for driving said object, a tachometer generator driven by said motor for producing a control voltage proportional to the speed of the motor, a nonlinear resistance network supplied from said tachometer generator for producing a control voltage having a nonlinear relationship to the speed of said motor, electrical connections for comparing said control voltage and said signal voltage, a resistance capacitance network for integrating the difference of said control voltage and said signal over a predetermined interval of time, and electric valve means for amplifying said integrated voltage to control said motor to drive said object in a direction corresponding to the direction of rotation of said pilot generator.

5. A servoamplifier control system comprising in combination, means for producing a signal voltage, a driven object, an electric motor for driving said object, a tachometer generator driven by said motor for producing a voltage proportional to the speed of said motor, a nonlinear resistance network supplied from said tachometer generator for producing a control voltage having a nonlinear relationship to said signal voltage, electrical connections for comparing said control voltage and said signal voltage, a resistance capacitance network for integrating the difference of said control voltage and said signal voltage over a predetermined interval of time, electric valve means for amplifying said integrated voltage to control said motor to drive said object in a direction corresponding to the polarity of said signal voltage.

6. A servoamplifier control system for driving an object into correspondence with a pilot device comprising driving means for said object, means for producing a signal voltage having a predetermined relationship to the system error between said pilot device and driven object, means for filtering relatively rapid variations from said error signal voltage, means for producing a control voltage proportional to the speed of said driving means, electrical connections for comparing said filtered voltage and said control voltage, means for integrating the difference of said filtered voltage and control voltage over a predetermined interval of time, and means for amplifying said integrated voltage to control said driving means to drive said driven object in a direction to diminish the error between said pilot device and driven object.

7. A servoamplifier control system for driving an object into correspondence with a pilot device comprising driving means for said object, means for producing a signal voltage having a predetermined relationship to the system error between said pilot device and driven object, means for filtering relatively rapid variations from said error signal voltage, means for producing a control voltage proportional to the speed of said driving means, means responsive to variations of error signal voltage of a predetermined value for temporarily rendering said filtering means inactive, electrical connections for comparing said filtered voltage and said control voltage, means for integrating the difference of said filtered voltage and control voltage over a predetermined interval of time, and means for amplifying said integrated voltage to control said driving means to drive said driven object in a direction to diminish the error between said pilot device and driven object.

8. A servoamplifier control system comprising means for producing a signal voltage proportional to the system error between a pilot device and a driven object, an electric motor for driving said driven object, a resistance capacitance network for filtering relatively rapid variations from said error signal voltage, electric valve means responsive to variations of said error signal voltage having a predetermined value for shunting the resistance element of said filtering network thereby temporarily to suspend the filtering action of said network, a tachometer generator driven by said motor for producing a control voltage proportional to speed, electrical connections for comparing said control voltage and said filtered voltage, a resistance capacitance network for integrating the difference of said control voltage and filtered voltage over a predetermined interval of time, and electric valve means for amplifying said integrated voltage to control said motor to drive said object in a direction to diminish said error.

9. A servoamplifier control system comprising means for producing a signal voltage proportional to the system error between a pilot device and a driven object, an electric motor for driving said driven object, a resistance capacitance network for filtering relatively rapid variations from said error signal voltage, electric valve means responsive to variations of said error signal voltage having a predetermined value for shunting the resistance element of said filtering network thereby temporarily to suspend the filtering action of said network, a tachometer generator driven by said motor for producing a control voltage proportional to speed, electrical connections for comparing said control voltage and said filtered voltage, electric valve means for limiting said filtered voltage to a value substantially equal to the voltage of said tachometer generator at maximum speed of said motor, a resistance capacitance network for integrating the difference of said control voltage and filtered voltage over a predetermined interval of time, and electric valve means for amplifying said integrated voltage to control said motor to drive said object in a direction to diminish said error.

WILLIAM C. HAHN.